March 19, 1946.  D. D. ORMSBY  2,396,803
VEHICLE
Filed May 10, 1943   3 Sheets-Sheet 2
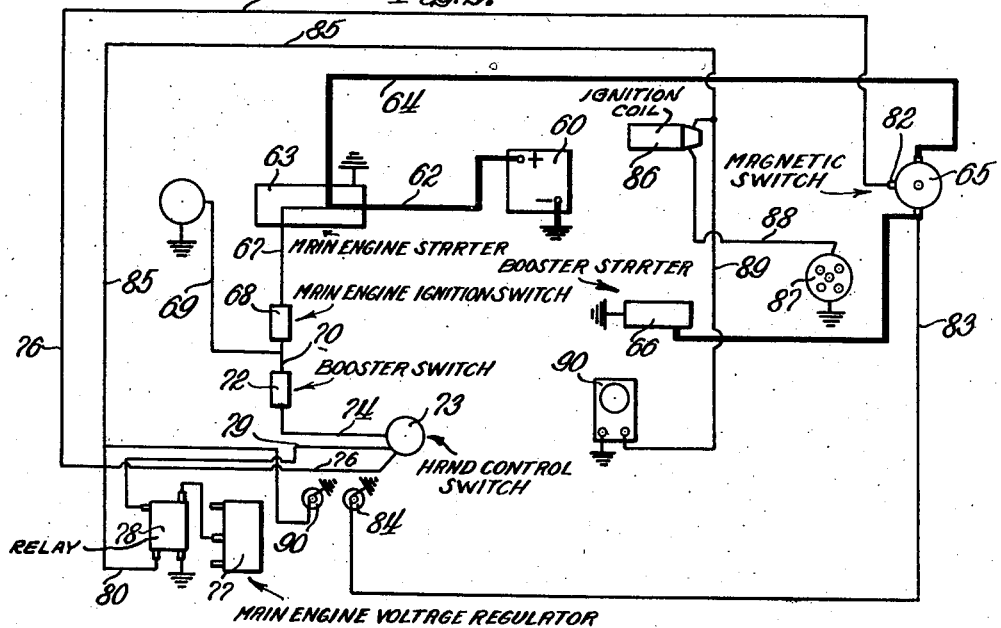
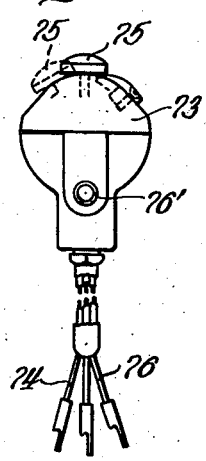
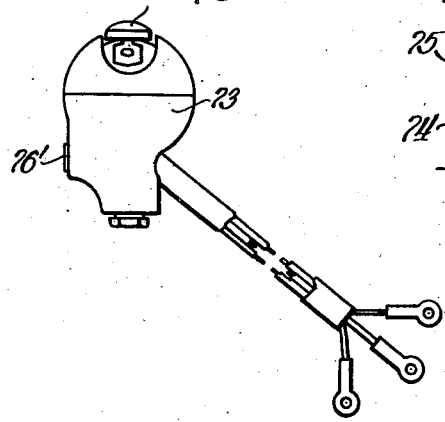
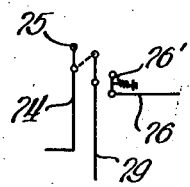
INVENTOR.
Donald D. Ormsby
BY Walter E. Schirmer
Atty.

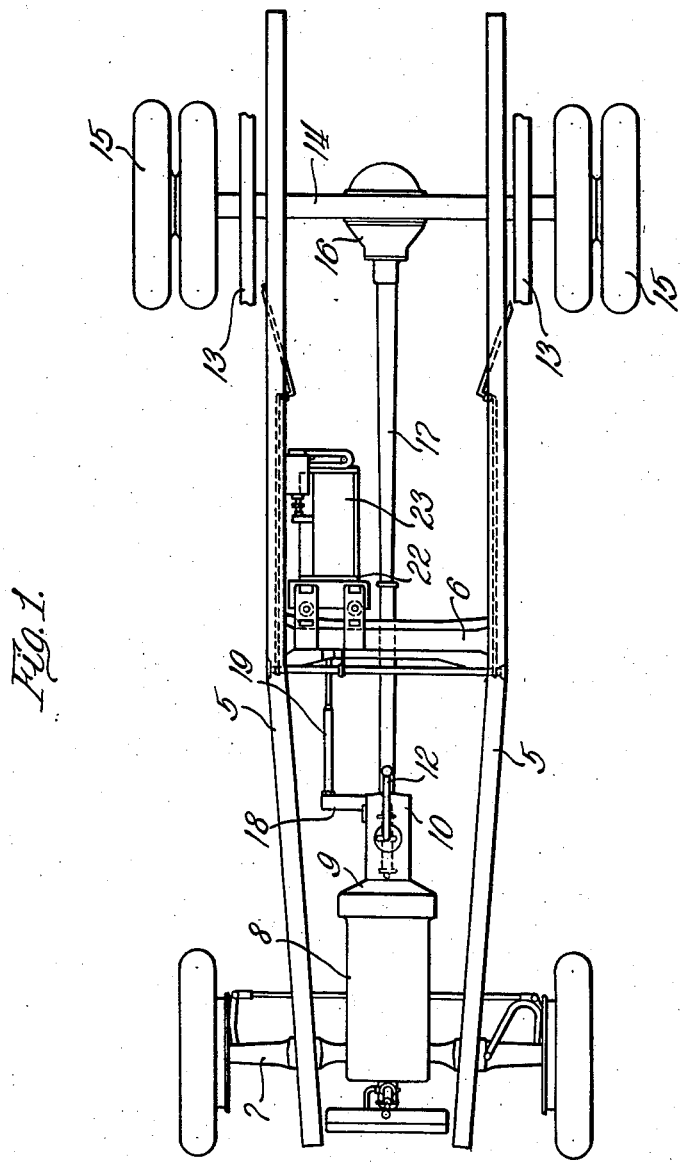

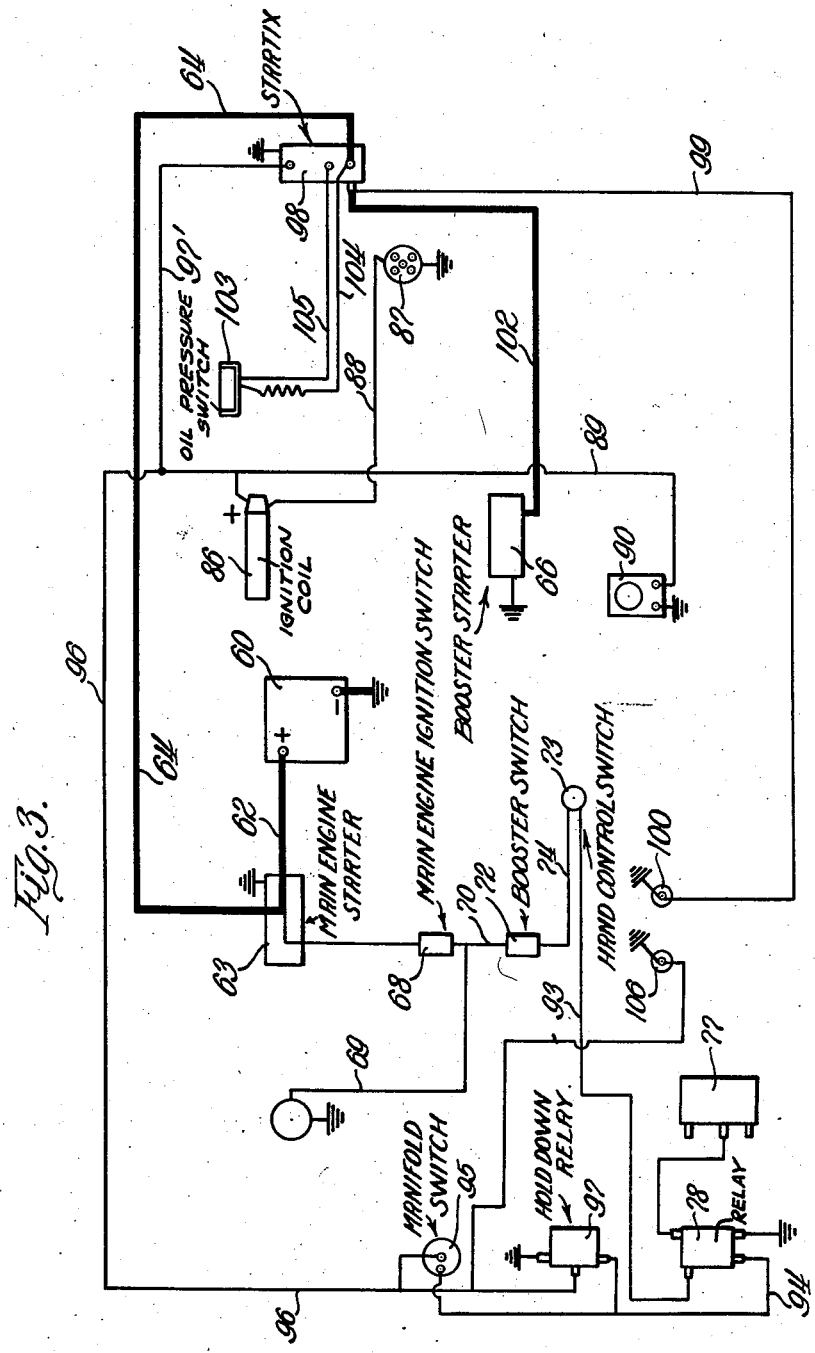

Patented Mar. 19, 1946

2,396,803

UNITED STATES PATENT OFFICE 2,396,803

VEHICLE

Donald D. Ormsby, Buchanan, Mich., assignor to Clark Equipment Company, Buchanan, Mich., a corporation of Michigan Application May 10, 1943, Serial No. 486,445

16 Claims. (Cl. 60—97)

This invention relates to vehicles, and more particularly is concerned with a vehicle of the booster engine type in which an auxiliary or supplemental engine is provided for adding its power to that of the main engine when the main engine is under load.

The present invention is an improvement upon the invention disclosed in my copending application, Serial No. 256,947, filed February 17, 1939.

One of the primary features of the present invention, which is of distinct importance, is an improvement in the control system which operates to start the booster engine under certain conditions. In the present construction, this control system departs from that shown in the application referred to above in providing a manually controlled switch accessible to the operator for closing the control circuit to energize the booster starting circuit which may be also subject to a condition responsive switch operating from the intake manifold of the main engine. Means is provided whereby the operator may manually close the booster engine starting circuit, providing the main engine is under sufficient load to close the manifold switch, and that the main engine is in operation. This prevents the operator from starting the auxiliary engine unless these conditions are present as it is not advisable to start the booster engine if the main engine is not operating.

In connection with this latter feature, a hand control switch is provided, mounted on the steering wheel within easy reach of the operator, whereby he can close the circuit from the battery to the switch through the relay controlled by the voltage of the main engine. From this relay the control circuit is energized leading to the ignition system of the booster engine and to the starting circuit thereof. As the booster engine starts and comes up to speed, suitable means is provided for cutting out the starting circuit, either by use of a Startix or a similar switch construction which may be controlled in response to oil pressure in the booster engine or in any other manner.

In an alternative form of the invention, a spring controlled push button is embodied in the hand control switch, which must be held closed to energize the starting circuit of the booster engine, and when released will operate to open this circuit.

Other objects and advantages of the present invention will appear more fully from the following detailed description which, taken in conjunction with the accompanying drawings, will disclose to those skilled in the art the particular construction and operation of a preferred form of the present invention.

In the drawings:

Figure 1 is a plan view, partly diagrammatical, of a vehicle employing the present invention;

Figure 2 is a circuit diagram of one form of control circuit;

Figure 3 is a similar view of a modified type of control circuit;

Figure 4 is an elevational view of the manual control switch;

Figure 5 is a side view of the control switch shown in Figure 4; and

Figure 6 is a diagrammatic illustration of the switch mechanism.

Referring now in detail to the drawings, in Figure 1 there is shown a vehicle chassis including the side rails 5 and the cross member 6. Secured to the forward end of the side rails 5 in any conventional manner is the front axle assembly 7 and mounted between the rails in any conventional manner is the main engine 8 having the clutch housing 9 secured thereto, carrying the transmission 10 which has the gear shift lever 12 projecting therefrom. At the rear end of the side rails 5, mounted in any suitable manner as by springs 13, is a drive axle assembly 14 carrying the drive wheels 15. The drive axle assembly 14 includes a differential carrier 16, and extending from this carrier to the rear end of the transmission is the usual propeller shaft 17.

The transmission is provided with a laterally off-set housing 18, carrying gears connected to the countershaft of the transmission 10, and including a lay-shaft 19 extending into a clutch housing 20, secured to the flywheel housing 22 of the auxiliary engine 23. The engine 23 is supported in any suitable manner from the side rails of the cross member 6, and is preferably disposed in a position between the propeller shaft 17 and one of the side rails with the engine reversed relative to main engine 8.

Preferably the auxiliary engine 23 is of smaller horsepower than the main engine 8 and under conditions selected by the operator and dependent upon the load of main engine 8 can be started and brought up to speed, and add its power to the lay-shaft 19 and through the gears in housing 18 to the countershaft of the transmission, whereby its torque is added to that of the main engine for driving the propeller shaft 17. Such a construction is especially desirable in vehicles carrying heavy loads, such as trucks, busses or the like where, under normal operations in flat country, the power of the main engine 8 alone is sufficient to maintain the desired load speed, and the booster engine power is utilized only when it is desired to have additional torque for carrying the load over hills or the like, or for acceleration when pulling away from a stop in order to maintain, as far as possible, the maximum road speed.

For this reason, it is desirable in the interest of economy that the booster engine be entirely stopped when its power is not required, but be instantly available whenever additional power is required.

Considering now the control circuit shown in Figure 2, the battery is indicated at 60 and has its output terminal connected through conductor 62 to the starter 63 for the main engine and also through conductor 64 to one terminal of a magnetic switch 65 which controls the starting of the booster engine starter motor 66. From the main engine starter 63, a conductor 67 extends through ignition switch 68 to a conductor 69 leading to the ignition circuit of the main engine. A second conductor 70 extends from the main engine ignition switch 68 through a manually controlled booster engine switch 73 which is shown in more detail in Figures 4, 5 and 6. The control switch 73, as shown in Figure 4, includes a conductor 74 leading from the booster switch 72 to the switch 73, which conductor has battery current impressed thereon. On the switch 73 is a control button 75 which, when moved to the dotted line position shown in Figure 4, is adapted to close a circuit between the conductor 74 and a conductor 79 leading to the control circuit for the booster engine. However, this circuit cannot be closed unless the main engine is operating. This particular control is provided by a voltage regulator 77, responsive to the main engine voltage and which operates from its generator terminal to close a relay 78 only when the main engine is operating at a sufficient voltage to close the circuit through relay 78 and conductor 80.

The switch mechanism 73 also includes a button 76' normally urged to open circuit position by a spring, but which, when closed by the operator, closes a circuit from conductor 74 and switch 73 through conductor 76 to terminal 82 of magnetic starter switch 65. This circuit is maintained closed only so long as the operator maintains button 76' depressed. The closing of this circuit allows current to flow through magnetic switch 65 which completes the circuit between the battery conductor 64 and the booster starter 66. At the same time, a circuit is closed through conductor 83 to a red light 84 mounted on the instrument panel indicating to the operator that the starting circuit to the booster engine has been energized. Release of button 76' by the operator opens this starting circuit and extinguishes light 84.

At the time the conductor 80 was energized through relay 78 and button 75, an energizing circuit was set up through conductor 85 to the booster engine ignition coil 86 and from this coil to the distributor 87 through conductor 88. Also a circuit was energized from conductor 85 through conductor 89 to a gas check valve 90 which is to be operated to admit gasoline to the carburetor of the booster engine. This ignition circuit is maintained at all times that the switch 75 is closed, and its operation is indicated by a light 90 on the instrument panel which indicates to the operator that booster engine circuit has been energized. The control of the relay 78 by voltage regulator 77 is desirable in order to insure that the booster engine ignition circuit and starting circuits cannot be energized unless the main engine is running, as it is undesirable to drive the vehicle solely from the booster engine.

Thus, the operator by manual control of the button 75 and button 76' is able to start the booster engine at any time that the main engine is operating, since movement of button 75 closes the ignition circuit to the booster engine and button 76' energizes the starting circuit.

In the circuit shown in Figure 3, similar reference numerals have been applied. However, in this form of construction the switch 73, when closed manually by the operator, energizes the conductor 93 which through the voltage regulator 77 and control relay 78 energize the conductor 94. This, however, will not energize either the booster engine ignition circuit or the booster engine starter circuit unless the manifold switch 95 is closed. The closing of this manifold switch is a function of the degree of vacuum in the intake manifold of the engine 8, and when the vacuum is decreased by opening of the throttle with the engine under load the switch 95 closes. Increased vacuum such as when the engine is idling when the throttle closes operates to open the switch. If the manifold switch 95 is closed, indicating that the main engine is operating under load, a circuit is established to conductor 96 and this circuit is thereafter maintained on the holddown relay 97 which is energized when the conductor 94 is energized and therefore maintains this circuit closed, locking out the manifold switch 95 so that the booster engine ignition circuit from the conductor 96 is completed to the booster engine ignition coil 86 and to the distributor 87 through conductor 88, also to the gas check valve 90 through conductor 89.

At the same time a circuit is established from conductor 96 through conductor 97' to the primary coil of a Startix 98, this circuit being completed through the conductor 99 and the indicating light 100. Closing of the primary circuit in the Startix 98 closes a circuit between conductor 64 through the Startix and through the conductor 102 to the starting motor 66 of the booster engine. As the booster engine begins to operate, the oil pressure in the crank case is adapted to close an oil switch 103 which has current impressed thereon by conductor 104 from battery and through conductor 105 energizes the secondary coil in the Startix, opening the circuit to the starting motor 66. The booster engine once it starts thus develops oil pressure operative to cut off the circuit to the starting motor, which is indicated to the operator by the light 100 being extinguished. At the same time the operator can ascertain that the booster engine ignition circuit is now in operation since light 106 is energized whenever the circuit through conductor 96 is energized. Thus the operator cannot start the booster engine unless the main engine is operating and is under load as determined by the manifold switch 95. However, once the booster engine has been started, push button 75 controls the switch 73 so that the booster engine can be stopped at any time by the operator moving button 75 back to the full line position shown in Figure 4.

It is thereby apparent that I have provided a control circuit for a booster engine which can be manually controlled by the operator, providing the main engine is operating, and in the case of Figure 3, providing the main engine is under load. Stopping of the booster engine in either case is controlled solely by the driver. I am aware that various changes may be made in certain details of the control circuit and fluid clutch arrangement herein shown, and I therefore do not intend to be limited except as defined by the scope and spirit of the appended claims.

I claim:

1. In a control system for a vehicle having a main engine and a booster engine, an ignition circuit for said booster engine, a starting circuit for said booster engine, manually controlled means for energizing said ignition circuit, and said starting circuit, and means responsive to predetermined voltage developed by operation of said main engine for preventing energization of said ignition circuit unless said main engine is operating.

2. The control system of claim 1 including means responsive to intake manifold pressure at said main engine for preventing completion of said circuits unless said main engine is operating under predetermined load.

3. In a control system for a vehicle having a main engine and an auxiliary engine, an ignition and starting circuit for said booster engine, a manually controlled switch in said circuit, a control relay in said circuit, and means for maintaining said relay closed only when said main engine is operating, said manually controlled switch being operative to close said circuits for starting said auxiliary engine whereby said auxiliary engine can be started only when said main engine is operating.

4. The control system of claim 3 including a switch in said circuit beyond said relay and manually controlled switch responsive to load on said main engine for completing said circuit only when said main engine is operating under a predetermined load, and means operated by energization of said load responsive switch preventing it from opening said circuit once the circuit has been completed.

5. In a control system for a vehicle having a main engine and an auxiliary engine, an ignition circuit for said auxiliary engine, a starting circuit for said auxiliary engine, a control relay in said ignition circuit normally holding said circuit open unless said main engine is operating, a manual control switch for energizing said ignition circuit through said relay, a switch element on said switch manually operable to close said starting circuit only when said ignition circuit is closed and so arranged and constructed that it must be held closed against spring pressure to energize said starting circuit, and means for indicating the condition of each of said circuits.

6. In a control system for a vehicle having a main engine and a booster engine, an ignition circuit for said booster engine, a starting circuit for said booster engine, means responsive to predetermined voltage developed by operation of said main engine conditioning said circuits for operation, a manually operable switch having means responsive to conditioning of said circuits for operation for manually closing said ignition circuit, and supplemental manually operable means on said switch for closing said starting circuit.

7. The control system of claim 6 wherein said supplemental manually operable means comprises a spring pressed switch normally urged toward switch-open position.

8. The control system of claim 6 wherein said voltage responsive means includes a voltage regulator responsive to voltage developed by said main engine and a control relay in said ignition circuit adapted to be closed by said regulator only when a predetermined voltage has been developed by said main engine.

9. In a control system for a vehicle having a main engine and a booster engine, an ignition and starting circuit for said booster engine including a manually controlled switch, and means in said circuit for preventing closing thereof unless said main engine is operating at a speed such as to develop a predetermined voltage.

10. The control system of claim 9 wherein said means comprises a voltage regulator connected to said main engine, and a control relay in said circuit operable to close only upon a predetermined voltage being developed in said regulator.

11. The control system of claim 9 including secondary means for preventing closing of said circuit unless the main engine is operating under more than a predetermined load.

12. The control system of claim 9 including a manifold vacuum responsive switch for preventing closing of said circuit unless the main engine is operating under more than a predetermined load, and means in said circuit for bypassing said vacuum switch after said booster engine starts.

13. A control system for a vehicle having a main engine and a booster engine, comprising a starting circuit for said booster engine including a magnetic starting switch, an ignition circuit for said booster engine including a control relay, a battery circuit including manually controlled switch means, means driven by said main engine for actuating said control relay to close the same only when said main engine is operating above a predetermined speed, means at said manual switch means for connecting said battery circuit to said control relay for energizing said booster ignition circuit, and supplemental means at said manual switch means for connecting said battery circuit to said starting circuit through said last-named connecting means.

14. The control system of claim 13 wherein said supplemental means includes a spring-controlled switch normally biased toward open position.

15. In a control system for a vehicle having a main engine and a booster engine, a battery for the ignition and starting system of said main engine, a starting and ignition circuit for said booster engine including a conventional ignition switch for connecting said circuit to said battery, a control relay in said circuit closed only when said main engine is operating above a predetermined speed, a second switch in said circuit in series with said relay and closed only when the vacuum in the main engine manifold is less than a predetermined amount, and a manual switch in said circuit between said ignition switch and said relay for selectively energizing said circuit only when said relay and vacuum responsive switches are closed.

16. The control system of claim 15 including means in parallel with said vacuum responsive switch for bypassing said switch once said circuit has been closed and until opening of said circuit by said manual switch.

DONALD D. ORMSBY.